United States Patent

[11] 3,544,705

[72] Inventor Eric Winston
    Melrose Park, Pennsylvania
[21] Appl. No. 776,714
[22] Filed Nov. 18, 1968
[45] Patented Dec. 1, 1970
[73] Assignee Jerrold Electronics Corporation
    Hatboro, Pennsylvania
    a corporation of Delaware

[54] EXPANDABLE CABLE BUSHING
    3 Claims, 6 Drawing Figs.
[52] U.S. Cl. .................................................. 174/75,
    174/65, 174/89
[51] Int. Cl. ................................................. H02g 15/02
[50] Field of Search.......................................... 174/65,
    71(C), 75.2, 83, 88.2, 89; 339/220, 256, 258;
    248/56; 16/108, 109; 285/(Inquired)

[56] References Cited
UNITED STATES PATENTS
2,485,364  10/1949  Deakin.........................339/258(P)UX
FOREIGN PATENTS
896,013  4/1944  France ........................  174/65
Primary Examiner—Laramie E. Askin
Attorney—Hopgood and Calimafde ABSTRACT: An adjustable ferrule or bushing for connection with different diameter coaxial cables having braided sheathing. A slit in the connecting body of the ferrule permits it to be expanded or contracted to fit between the dielectric and sheath of the size cable being connected. A rib or lip near the connecting extremity of the ferrule reinforces the body thereof and provides a retaining ridge across which the braid of the cable is clamped to prevent its pulling free of the ferrule.

PATENTED DEC 1 1970                3,544,705
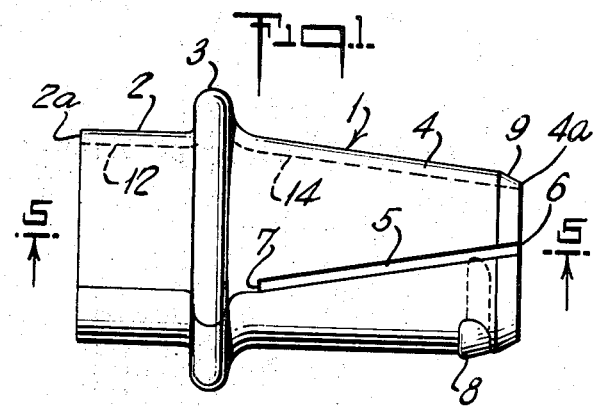
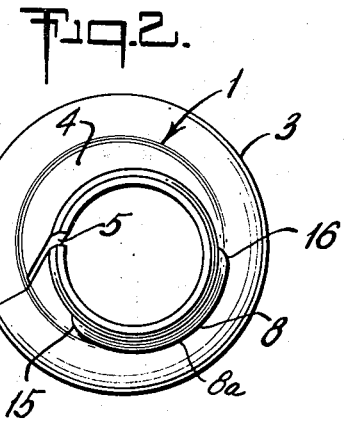
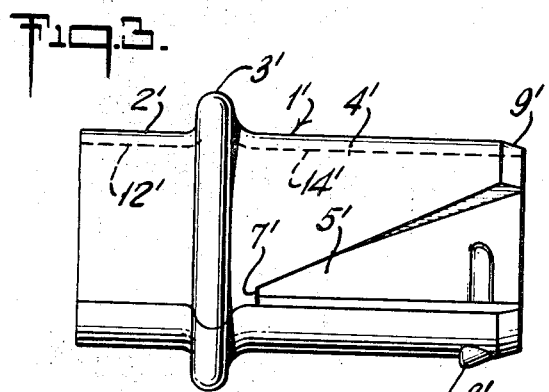
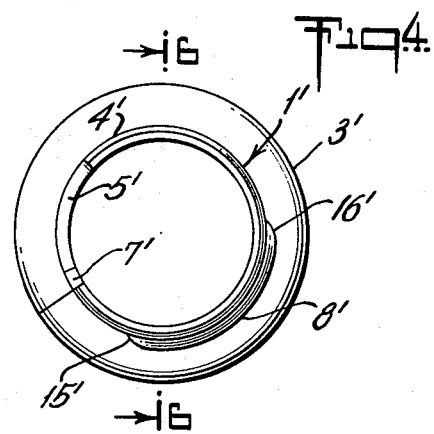
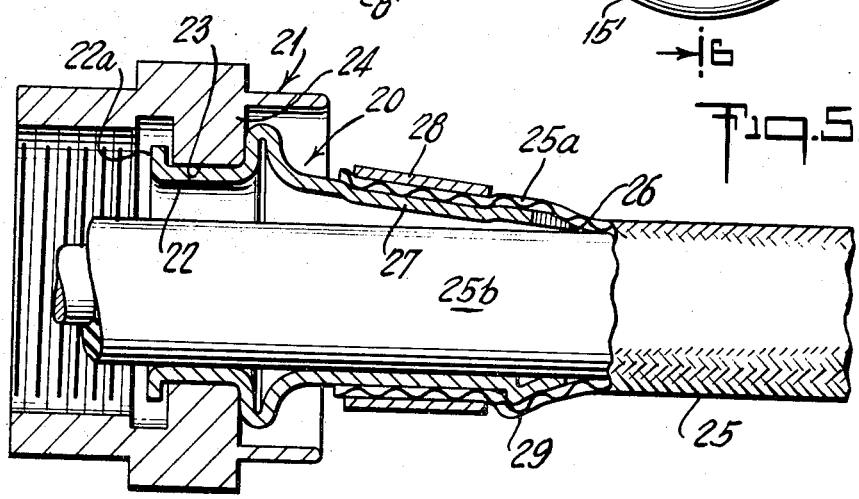
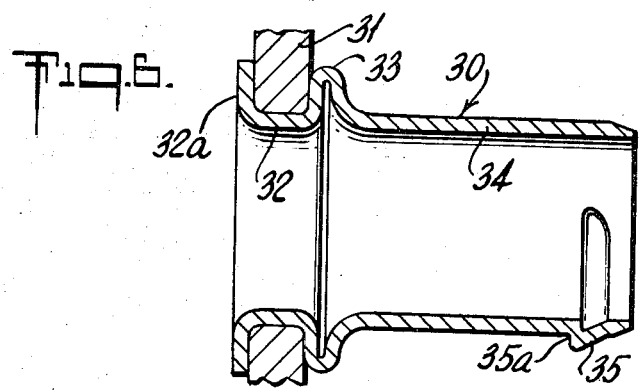
INVENTOR
ERIC WINSTON
BY
Hopgood & Calimafde
ATTORNEYS

EXPANDABLE CABLE BUSHING

BACKGROUND

This invention is in the field of electrical hardware, and particularly pertains to Community Antenna Television (CATV) installations and the like.

In the installation of CATV and similar systems, it is necessary to connect different diameter coaxial cables to fittings and housings. In these connections, the cable sheath must be securely connected to the fitting to assure proper electrical grounding of the sheath, as well as a rugged physical connection.

The fact that different sizes of cables are used in these installations has made it difficult to obtain good connections with a single-size clamp.

Presently, two sizes of lead-in coaxial cable are commonly in use in CATV installations, the diameter of the dielectric of one measuring 0.146 inch and the other measuring 0.185 inch.

Prior to the invention, the different size cables required either the use of different fittings, each with an appropriately sized connecting ferrule, or the use of a universal-type toothed clamp. Both of these installation techniques had shortcomings. For example, it was necessary to have two complete sets of fittings, one for each size cable, which increased the inventory required, and related costs. Further, the quality of electrical contact between the cable sheath and fitting provided by the universal toothed clamp was, or often became, poor.

Accordingly, it is an objective of this invention to provide a connecting ferrule or bushing of one configuration which can be expanded or contracted to receive coaxial cables having dielectric diameters within a selected size range.

Another objective of the invention is to provide such a ferrule which will make high quality circumferentially extensive electrical contact with the sheath of all cables attached thereto within the chosen size range of the ferrule.

Another objective of the invention is to provide a ferrule connection having superior strength with which to resist bending, torque and tension loads as well as the effects of vibration.

SUMMARY

Briefly, the invention is a metal ferrule which is inserted between the sheath and dielectric of a connecting coaxial cable. The ferrule is a substantially tubular structure having a base portion which connects to an associated fitting, an outer body which engages the connecting cable, and an outward annular flange which divides the base portion from the outer body.

The outer body of the ferrule is deformable, in that it is an arcuate structure capable of assuming cylindrical or frustoconical shape. This deformability results from the removal of a wedge of material from its tubular body. The removal of this wedge of material permits the outer body to be asymmetrically contracted to form a frustoconical section in which the interior diameter of the smaller end matches the outer diameter of the cable being connected thereto. A conventional annular ring clamp holds the cable sheet firmly in electrical contact with the ferrule.

A lip extending radially around a portion of the outer end of the outer body strengthens the ferrule body and functions to prevent the clamp and sheath from sliding off of the ferrule.

The connecting ferrule of the invention may be initially manufactured with the outer body in cylindrical shape or contracted to the frustoconical shape.

The invention has the advantages of providing a standard single ferrule or bushing which may be readily expanded or contracted to fit connecting cables of various size within its selected size range.

The invention has the further advantage of providing substantially circumferential electrical contact between the ferrule and the cable sheath. This is accomplished by the removal of a minimum of material from the outer body to provide for a radial adjustment thereof.

Other objectives, advantages, and various further features of novelty and invention will be pointed out or will occur to those skilled in the art from a reading of the following specification in conjunction with the accompanying drawings.

BRIEF DESCRIPTION OF THE DRAWINGS

FIG. 1 is a side view of a contracted bushing of the invention.

FIG. 2 is an end view of the bushing of FIG. 1.

FIG. 3 is a side view of an expanded bushing of the invention.

FIG. 4 is an end view of the expanded bushing of FIG. 3.

FIG. 5 is a cross-sectional view of the bushing of FIG. 1, taken along line 5–5 thereof, as used to connect a coaxial cable to the female section of a union.

FIG. 6 is a cross-sectional view of the bushing of FIG. 3 taken in the plane of the drawing, after installation in a wall of a fitting, such as a junction box.

DESCRIPTION OF THE PREFERRED EMBODIMENTS

The ferrule or bushing of the invention is a unitary structure which is preferably formed upon a mandrel from a precut piece of sheet metal, or which can be machined from tubing. Annealed low-leaded brass sheet or tubing having a thickness of 0.015 inch has proved to be an advantageous material.

Referring now to FIG. 1, the ferrule therein illustrated is comprised of a generally tubular body 1 having a cylindrical base section 2 with an interior side 12, and a tapered outer body 4 with an interior side 14.

A flange 3 separates the cylindrical base section 2 from tapered outer body 4, and is formed by radially expanding body 1 as the ferrule is formed upon a mandrel. Flange 3 strengthens the ferrule body, aids in its retention to fittings, and isolates base section 2 from deformation when body 1 is adjusted or squeezed against the cable dielectric when the cable is connected thereto.

Tapered outer body 4 has a slit 5 from a point 6 at the outer end of body 4 to a base point 7 near flange 3 where the inside diameter of tapered body 4 becomes substantially equal to that of cylindrical section 2. Slit 5 may be cut from a tubular ferrule, or blanked from sheet stock before rollup in the case of the mandrel formed ferrule.

By utilizing a single slit in the ferrule body to permit adjustment in the diameter thereof, a maximum of material is retained within the body. In this manner, greater strength is achieved than could be achieved with a plurality of fingers. This greater strength provides greater resistance to breaking, displacement and misalinement of the cable with respect to the ferrule.

The slit 5 is wedge-shaped when the ferrule is in the expanded form, but becomes helical when the ferrule is asymmetrically contracted. Asymmetrical contraction is utilized and results from the presence of a reinforcing rib and locking lip 8 described below. By angling the slit, complete removal of an axial section of the ferrule body, which would eliminate circumferential contact with the cable sheath, is avoided.

A lip 8 protrudes from body 4 and extends radially around a sector of approximately 120° thereof, near the outer end 4a of body 4.

Body 4 is annularly beveled as at 9 at its outer end 4a, substantially reducing the wall thickness thereof to facilitate its insertion between the dielectric and sheath of a connecting cable.

Referring now to FIG. 2, it can be seen that the sides of body 4 slant inwardly at various degrees around its circumference between flange 3 and its outer end 4a, giving body 4 an asymmetrical taper. If the degree of such slant is measured with respect to the longitudinal axis of cylindrical section 2, the taper varies from zero along the side containing the midpoint 8a of lip 8, to a maximum along the side diametrically across from point 8a. This asymmetry serves to minimize the degree of bend imposed upon lip 8 during the formation and expansion of the ferrule.

FIG. 3 illustrates a ferrule of the invention made in expanded form, or the ferrule of FIG. 1, after tapered body 4 therein has been expanded. In the latter instance, the expansion is best accomplished by passing a rounded instrument having the expansion process, the dielectric of the cable to be attached, through the ferrule from the base end 2a; this sets the inner diameter of the outer end of the ferrule to the precise outer diameter of the dielectric of the cable, facilitating insertion of the ferrule.

In FIG. 3 tapered outer body 4' has been expanded to the maximum, so that the interior diameter of body 4' is substantially equal to that of cylindrical section 2'. Slit 5 has been opened to 5' by the expansion process, resulting in a wedge-shaped slit 5' tapering from the annularly beveled edge 9' of tubular body 1' to a base point 7' near the flange 3'.

FIG. 4 is an end view of the expanded ferrule of FIG. 3. By comparing FIG. 4 with FIG. 2, it can be seen that when the ferrule is expanded only the angled-in sides of tapered outer body 4 of FIGS. 1 and 2 are expanded, so that the interior sides 12' and 14' of cylindrical section 2' and 4' become substantially coextensive. It is also apparent from the foregoing comparison that the expansion of the ferrule, as described, results in the outer ends 15 and 16 of lip 8 being bent outwardly only slightly to position 15' and 16' on lip 8'.

FIG. 5 illustrates a female fitting 21 into which a ferrule 20 is inserted. The cylindrical base section 22 of ferrule 20 rides loosely through an annular opening 23 in wall 24 of fitting 21, and the outer end of section 22 is bent outwardly creating an end flange 22a. Ferrule 20 is thus held within annular opening 23 by the interface of flange 22a and wall 24. Flange 22a is not rolled tightly against wall 24 in order that ferrule 20 may rotate within fitting 21 until the fitting 21 is tightly threaded against its male counterpart; at which time circumferential contact between the ferrule and fitting 21 is completed.

FIG. 5 illustrates a coaxial cable 25 connected to ferrule 20. The beveled annular edge 26 of ferrule 20 has been inserted between the sheath 25a and the dielectric 25 b of cable 25, so that sheath 25a rides telescopically over the outside of the tapered body 27 of ferrule 20.

A conventional ring-type clamp 28 is crimped around sheath 25a and tapered body 27 inside of lip 29. Retaining lip 29 described above in connection with FIG. 1 prevents clamp 28 and cable sheath 25a from sliding off of tapered body 27. When smaller cable is connected, tight crimping of clamp 28 may result in the bending in of the tapered body of the ferrule. This is permissible as flange 3 isolates base 2 from such deformation. Positive electrical contact and a strong physical connection between sheath 25a and ferrule 20 are thus assured.

FIG. 6 is a cross-sectional view of the ferrule of FIG. 3 inserted through and attached to a section of wall 31 representative of a wall section of component housings with which the invention may be utilized. The outer end 32a of cylindrical base 32 has been flared outwardly and against wall 31. In this instance wall 31 is trapped firmly between flange 33 of the ferrule and the flared end portion 32a of cylindrical base 32 in order to assure lasting electrical connection therebetween.

FIGS. 5 and 6 further show that the retaining lips 29 and 35 of the ferrules therein illustrated are pressed out of their respective outer bodies 27 and 34. This operation is preferably performed upon the die-cut metal sheet before it is conformed to the mandrel to produce the ferrule. The surface 35a of lip 35 which faces flange 33 of the ferrule is substantially perpendicular to body 34, so as to offer maximum resistance to the withdrawal of the cable sheath when the retaining clamp is tightened thereon.

The invention as herein described is a versatile and efficient device which permits coaxial cables of various sizes to be connected to the same fitting or electrical component housing. It is economical to manufacture, and imparts a significant degree of universality to those components with which it is used.

While the principles of the invention have been described in connection with the above specific apparatus, it is to be clearly understood that this description is made only by way of example and not as a limitation to the scope of the invention as set forth in the accompanying claims.

I claim:

1. An expandable coaxial cable connecter capable of receiving all sizes of coaxial cables having dielectric diameters within a selected size range comprising:

a unitary tubular body having a cylindrical base portion and a tapered outer portion, said portions separated by a centrally positioned flange;

said outer portion tapering from said flange to an outer end to form a frustoconical section angularly offset from said flange so as to be asymmetrically tapered with respect thereto, and including a linear slit extending generally helically from the outer end to a point adjacent to but removed from said flange, at which point the inner diameter of said outer portion is substantially equal to the inner diameter of said base portion, said outer end comprising a substantially circular cross section with an annularly beveled edge, said bevel extending outwardly from said end to the exterior surface of said body portion to provide a reduction in the wall thickness to facilitate the insertion of said end between the dielectric and sheath of a coaxial cable; and a lip formed along the periphery of said outer end on the exterior surface of said outer portions extending over a selected arcuate region adjacent but apart from said bevel, the midpoint of said lip located along a side of said tapered body portion where the taper measured with respect to the longitudinal axis of the cylindrical base portion is substantially zero, said slit passing through an arcuate region of said tapered body apart from that region containing said lip, whereby the tapered end portion may be expanded by opening said slit to match the diameter of the outer end of the diameter of the dielectric of a coaxial cable.

2. The connecter of claim 1 further comprising a threaded female fixture with a cylindrical opening sized to slide over the cylindrical base portion and having a wall which abuts said flange in assembly, said fixture held in assembly by a second flange formed at the end of said base portion.

3. The connecter of claim 2 in assembly with a conventional coaxial cable having a sheath, a dielectric portion and an inner conductor wherein:

said outer beveled end of said tapered portion is positioned between said dielectric portion and said sheath, said sheath extending over said lip and abutting said centrally positioned flange; and a ring-type clamp positioned around said sheath and said tapered body portion above said lip, whereby said lip prevents said sheath and clamp from sliding off said tapered body.